United States Patent [19]
Dundore

[11] 3,919,778
[45] Nov. 18, 1975

[54] DRAFTING MACHINE
[76] Inventor: Mark B. Dundore, 12 W. Brook Drive, Akron, Pa. 17502
[22] Filed: July 1, 1974
[21] Appl. No.: 484,468

[52] U.S. Cl. ............................................... 33/80
[51] Int. Cl.² ....................................... B43L 13/02
[58] Field of Search ...................... 33/80, 81, 78, 76

[56] References Cited
UNITED STATES PATENTS
| 1,322,592 | 11/1919 | McTaggart | 33/80 |
| 1,672,751 | 6/1928 | Conti | 33/80 X |
| 2,511,654 | 6/1950 | Spoor | 33/80 |
| 3,714,714 | 2/1973 | Bullard | 33/80 |

Primary Examiner—Harry N. Haroian
Attorney, Agent, or Firm—James J. Kennedy

[57] ABSTRACT

A drafting machine detachably connectable to a drawing board having parallel arms, a rule extending between and connected to the arms and a universal template holder slidably connected to the rule. The rule is adapted to be positioned laterally as well as vertically with respect to the arms and the template holder can be precisely located with respect to the rule by means of a magnifying glass mounted in the template holder.

10 Claims, 5 Drawing Figures

U.S. Patent   Nov. 18, 1975   Sheet 2 of 2   3,919,778
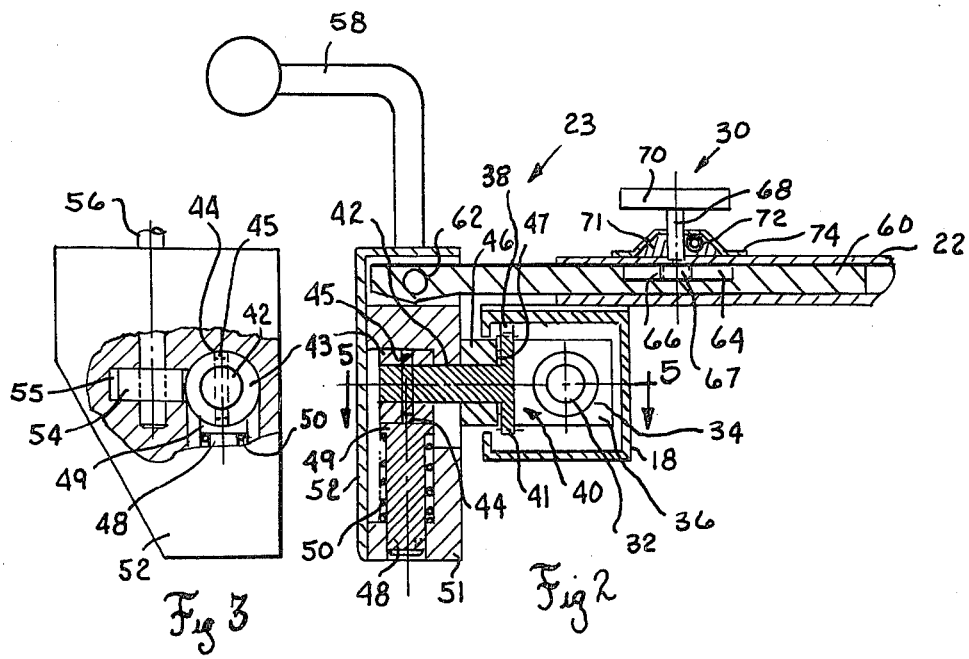
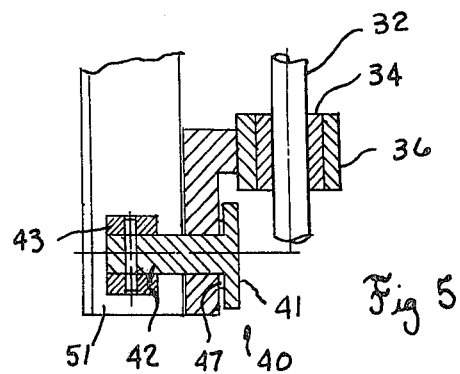
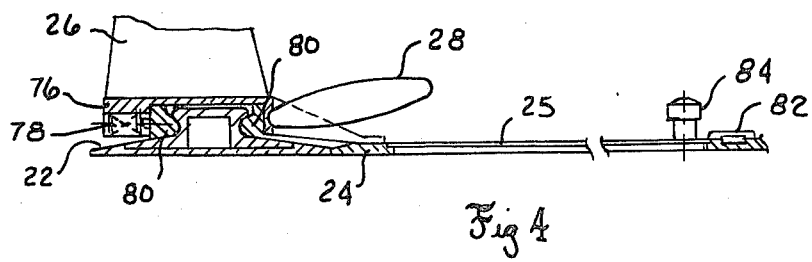

3,919,778

DRAFTING MACHINE

BACKGROUND OF THE INVENTION

The art is replete with attempts to make a simple yet accurate drafting machine. There prior art machines are often times inaccurate and difficult to keep adjusted. These machines are designed with numerous pivotal connections on some and long unsupported arms on others. This construction makes it difficult to draw a long straight line or to project an accurate view from one end of a large drawing to the other.

One of the most accurate drafting instruments available for the large layout type drawings is the parallel rule, but a disadvantage of the parallel rule is that it is inconvenient in that it does not have as an integral part a protractor, a common component of most drafting machines.

SUMMARY OF THE INVENTION

The drafting machine described by the present invention is designed to make large layout drawings as well as small detail drawings in a more accurate fashion then has heretofore been known. Using calibrated horizontal and vertical scales and a series of interchangeable templates which can be precisely located, a drawing can be made in less time and more accurately than any commercially available drafting machine.

It is a primary object of my invention to provide a simple drafting machine easily adaptable to fit any standard drafting table.

It is another object of my invention to provide a drafting machine which will be accurate through precise calibration in both the vertical and horizontal direction.

It is a further object of the invention to provide a parallel rule that can be laterally positioned so that measurements along the rule can be taken in even increments.

A still further object of the invention is to provide a universal template holder which is flush with the rule and slidably attached thereto and which can be precisely located with respect to the rule.

These and other objects of the invention will become more apparent from the following detail description and with further reference to the accompanying drawings.

BRIEF DESCRIPTION OF THE DRAWINGS

FIG. 2 is a section view taken along the lines 2—2 of FIG. 1, showing the connecting and locking means between the parallel rule and the arms.

FIG. 3 is a rotated, partially cut away end view of the connecting means shown in FIG. 2.

FIG. 4 is a partially broken, detail view of the universal template holder.

FIG. 5 is a sectional view taken on line 5—5 of FIG. 2.

DESCRIPTION OF THE PREFERRED EMBODIMENT

Figure 1:
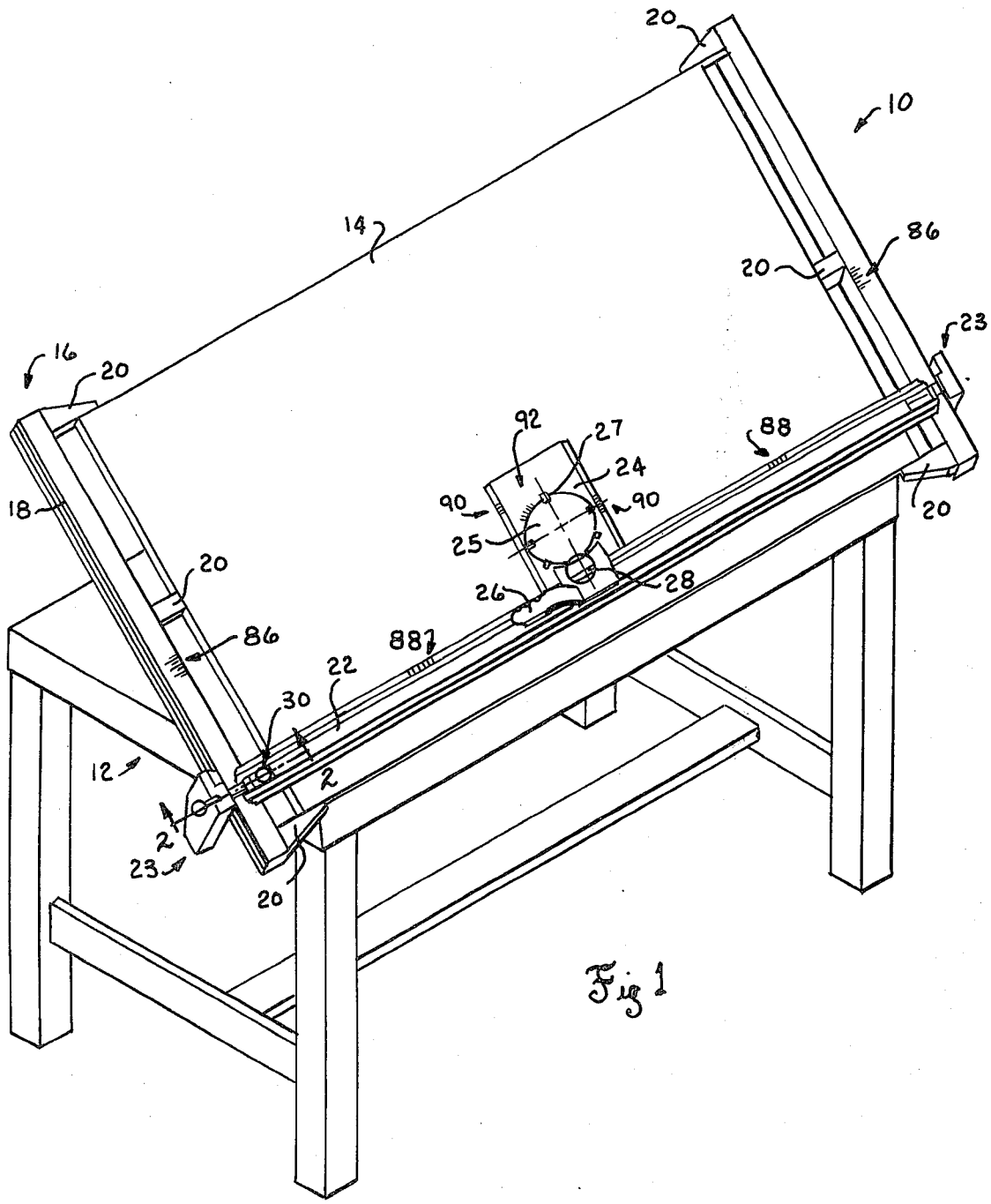
FIG. 1 is a perspective view of the drafting machine constructed in accordance with the present invention as typically mounted on a drafting table.

Referring now to the drawings, particularly to FIG. 1, the drafting machine of the present invention, shown generally by the numeral 10, is a relatively simple device which will fit any standard drafting table 12 by being fixed to the table top 14.

Drafting machine 10 is comprised of a base portion 16 which includes two spaced-apart parallel c shaped channels forming arms 18 mounting means 20 which physically attach arms 18 to the table top 14 by clamping or other suitable means, a parallel rule 22 slidably connected to the parallel arms 18 by both ends by means of a connecting device 23, a universal template holder 24 slidably attached to parallel rule 22 and moveable therealong by handle 26, and lateral adjusting means 30 which permits the parallel rule 22 to be adjusted between the parallel arms 18 in a manner to be more fully explained.

The template holder 24 is comprised of a piece of flat transparent plastic stock or other suitable material which is generally rectangular in shape. One end of holder 24 butts against rule 22 so that a continuous right angle is formed between the holder 24 and rule 22. The interior of holder 24 is cut out in an appropriate shape, in this case a circle, and is adapted to receive a circular template 25 having suitable shapes formed therein. A handle 26 is slidably connected to the rule 22, as will be more fully described in connection with a description of FIG. 4, and is connected to holder 24 so that the holder 24 slides along rule 22 with handle portion 26. A magnifying glass 28 is mounted in handle 26 and extends outwardly therefrom over the holder 24.

The vertical centerline 27 of the circular template 25 coincides exactly with the centerline (not shown) of holder 24. The vertical centerline 27 is scribed on holder 24 and extends along the holder 24 to the bottom edge butting rule 22 under the magnifying glass 28.

Turning now to FIGS. 2 and 3 of the drawings, the arm 18 is a channel member having a general c shape. Arm 19 has identical cross-section Within arms 18 are disposed a shaft 32 extending from end to end centrally of the arms. The connecting means 23 is comprised of a bushing 34 slidably connected to shaft 32, a gear rack 38 on the arms 18 and 19 and a spur gear assembly 40 rotatable in a connecting arm 46 and connected to bushing 34 to provide slidable movement of bushing 34 as the gear assembly rotates.

The bushing 34, mounted in block 36, is slidably connected to shaft 32. The gear rack 38 is provided in the upper interior portion of arms 18 and 19, as shown in FIG. 2, and is adapted to be engaged by the spur gear assembly 40 which is connected to block 36 as will be described below so that the spur gear 41 may rotate in engagement with and advance along rack 38, causing block 36 and bushing 34 to slide relative to shaft 32.

As shown in FIGS. 2 and 5, the gear assembly 40 includes a spur gear 41, cylindrical shaft 42, and a larger diameter cylindrical portion 43 which fits over the inward end of shaft 42. A hole 44 extends through shaft 42 and cylindrical portion 43 and is adapted to receive a roll pin 45 which holds portion 43 on shaft 42.

A connecting arm 46 is connected to the block 36 and extends generally rearward. Shaft 42 of spur gear assembly 40 extends through arm 46 and is rotatable with respect thereto. As spur gear 41 rotates, block 36 moves along shaft 32.

A friction shaft 48, as shown in FIG. 2, mounted in connecting arm 46, is urged into engagement with cylindrical portion 43 of gear assembly 40 by means of a compression spring 50 which is disposed about shaft 48 between an upper lip 49 and housing 51. Shaft 48 imparts frictional contact with the gear assembly 40 so that the connecting means 23 rotates against a resistance in a smooth fashion. A cover portion 52 fits over the arm 46 as shown in FIGS. 2 and 3.

Referring to FIG. 3, a brake means is provided to engage cylindrical portion 43 of gear assembly 40. The brake means is comprised of a cam brake 54 having a hard rubber exterior 55. Brake 54 is mounted on a vertical shaft 56, having a handle portion 58. By turning handle 58, the shaft 56 and brake 54 rotate in housing 46, causing the hard rubber surface 55 to be forced into tighter and tighter engagement with cylinder 43 preventing the cylinder 43 from turning which, in turn, prevents further movement of the connecting means 23 along shaft 32. By releasing the handle 58, the friction engagement is relieved and the connecting means may again move relative to shaft 32.

A rectangular shaft 60 (one for each end of parallel rule 22) is adapted to be received in the end of parallel rule 22, as shown in FIG. 2. Shaft 60 is disposed so as to be slidably engageable in the end of parallel rule 22. A pin connection 62 extends through shaft 60 to pivotally connect the shaft to the housing 46. In this manner, shaft 60 can pivot about pin 62 and fulcrum 61 so that the parallel rule 22 will float relative to the drawing board surface 14 and the connecting means 23.

The lateral adjusting means 30 is comprised of a gear rack 64 located on at least one of the shafts 60, midway between the ends of the shaft, a spur gear assembly 66 engageable with gear rack 64, and a shaft 67 connecting the spur gear 66 to a shaft 68 which, in turn, is connected to a knob 70 and is rotatable therewith.

A friction bushing 71 retains a compression spring and a abjustable bolt 72 and frictionally engages shaft 68. A cover 74 encloses the bushing 71. By turning the knob 71, the spur gear 66 advances along rack 64, causing the rule 22 to slide either left or right, depending upon which direction knob 71 is turned, within the limits of movement defined by the length of the gear rack 64, relative to shaft 61. To provide this lateral adjustment feature, it is necessary to provide the adjustment knob and gear assembly only on one side of the parallel rule.

Referring now to FIG. 4, the universal template holder 44 includes a bracket portion 76 which is attached to parallel rule 22 by means of a spring plunger 78 which, in turn, urges slides or balls 80 made of suitable material, against the rule 22. The slides 80 are retained in bracket 76. The bracket 76 is also attached to the holder 24 and handle 26 is attached to or forms an integral part of bracket 76.

Magnifying glass 28 is also retained in the bracket 76 and extends outwardly and upwardly therefrom in a cantilever fashion out over the template holder 24.

The template 25 shape fits in holder 24 and is further retained by a spring retainer 82. A knob 84 permits the circular template to be rotated within holder 24. Suitable clamping means (not shown) may also be provided to clamp the template 25 relative to holder 24.

To facilitate the precise positioning of the parallel rule 22 with respect to arms 18 and the template holder 24 with respect to the parallel rule, a series of appropriate calibrating indicia are provided along the arms and along the rule itself. These calibrations, having a suitable unit of measurement, are shown generally by the numerals 86 and 88 in FIG. 1 Similarly, appropriate calibrations 90 and 92 are provided on template holder 24.

In operation, the brake handle 58 is released so that the parallel rule 22 may be moved with respect to arms 18. When the precise location is reached, the brake handle 58 is again engaged so that the connecting means 23 is locked, preventing the rule 22 from moving. Next, the calibrations 88 on the rule are properly aligned with marking on the drawing on the board by activating the lateral adjusting means shifting the rule either right or left with respect to arms 18 to the desired location. Then handle 26 is engaged to slide the template holder 24 along the rule. The precise location of the template indicia is achieved by aligning the centerline 27 with the appropriate calibrations 88 on the rule 22. Magnifying glass 28 permits a precise location of the centerline with respect to the rule calibrations 88.

Because the edge of the holder 24 and the edge of the rule 22 abut each other, a perfect right angle is formed between the two elements.

The indicia 92 on template 25 and holder 24 permit the template to be used as a protractor. By rotating the template 25 with respect to the holder 24 the template patterns may be located at any angle necessary.

I claim:

1. A drafting machine comprising, in combination, a base detachably mounted on a drawing board, said base comprised of a pair of parallel spaced apart arms, a parallel rule extending between said arms, means for connecting said parallel rule to said arms for slidable movement with respect thereto, template means slidably mounted on said parallel rule, and means on said rule including a first shaft extending horizontally into said rule for slidable telescopic movement with respect thereto and extending between said rule and said connecting means for adjusting the lateral position of said rule relative to said arms.

2. A drafting machine as described in claim 1, wherein said connecting means includes a second shaft disposed in said arms, a connecting arm, a bushing mounted on said connecting arm and slidable on said second shaft, and gear means extending through said connecting arm and rotatable with respect thereto.

3. A drafting machine, as described in claim 2, wherein said lateral adjusting means includes a gear rack on said first shaft, a spur gear connected to said rule and rotatable with respect thereto and a knob for rotating said spur gear causing said rule to slide laterally with respect to said first shaft, said first shaft being pivotally engagable with said connecting means and slidable with respect to said rule.

4. A drafting machine, as described in claim 1, wherein braking means is associated with said connecting means for locking said connecting means relative to said parallel arms and preventing movement of said parallel rule with respect to said arms.

5. A drafting machine, as described in claim 1, wherein calibrating indicia is provided on said parallel arms and said parallel rule for precisely locating said rule with respect to said arms and magnifying means is provided on said template means for precisely locating said template means with respect to said parallel rule calibrating indicia.

6. A drafting machine comprising, in combination, a baase detachably mounted on a drawing board, said base comprised of a pair of parallel spaced apart arms, a parallel rule extending between said arms, means for connecting said parallel rule to said arms for slidable movement with respect thereto, template means slidably mounted on said parallel rule, and means on said rule including a first shaft extending between said rule and said connection means for adjusting the lateral position of said rule with respect to said arms, said connecting means including a second shaft disposed in said arms, a connecting arm gear means comprised of a rack on said arms and a spur gear engagable with said rack and extending through said connecting arm and rotatable with respect thereto, bushing means mounted on said connecting arm and slidably engaging said second shaft.

7. A drafting machine, as described in claim 6, wherein said lateral position includes a gear rack on said first shaft, a spur gear connected to said rule and rotatable with respect thereto and a knob for rotating said spur gear causing said rule to slide laterally with respect to said first shaft, said first shaft being pivotally engagable with said connecting means and slidable with respect to said rule.

8. A drafting machine, as described in claim 6, wherein said second shaft is pivotally connected to said housing.

9. A drafting machine, as described in claim 6, wherein braking means is associated with said connecting means for locking said connecting means relative to said parallel arms and preventing movement of said parallel rule with respect to said arms.

10. A drafting machine, as described in claim 9, wherein said braking means includes an actuating handle and cam means at the end of the handle engagable with said gear means whereby said cam means may be turned into frictional contact with said gear means to prevent rotation thereof.

* * * * *